United States Patent [19]

Van Beersel et al.

[11] Patent Number: 5,397,615
[45] Date of Patent: Mar. 14, 1995

[54] HEAT SHRINKABLE WRAPAROUND ARTICLES FOR COVERING ELONGATE OBJECTS

[75] Inventors: Jos Van Beersel, Temse, Belgium; Robin John, Avon, United Kingdom

[73] Assignee: N.V. Raychem S.A., Kessel-Lo, Belgium

[21] Appl. No.: 87,704

[22] PCT Filed: Jan. 7, 1992

[86] PCT No.: PCT/GB92/00028
§ 371 Date: Jul. 9, 1993
§ 102(e) Date: Jul. 9, 1993

[87] PCT Pub. No.: WO92/11997
PCT Pub. Date: Jul. 23, 1992

[30] Foreign Application Priority Data

Jan. 9, 1991 [GB] United Kingdom ............. 9100373

[51] Int. Cl.⁶ ............................................. B32B 31/26
[52] U.S. Cl. ............................. 428/57; 156/85; 156/86; 264/230; 264/342 R; 428/77; 428/78; 428/913
[58] Field of Search ............... 156/85, 86; 264/230, 264/342 R; 428/57, 77, 78, 913

[56] References Cited

U.S. PATENT DOCUMENTS

| | | | |
|---|---|---|---|
| 3,455,336 | 7/1969 | Ellis | 138/156 |
| 3,770,556 | 11/1973 | Evans et al. | 161/39 |
| 4,200,676 | 4/1980 | Caponigro et al. | 428/57 |
| 4,356,222 | 10/1982 | Harakawa et al. | 156/86 |
| 4,359,502 | 11/1982 | Caponigro et al. | 428/251 |
| 4,424,246 | 1/1984 | Pieslak et al. | 156/86 |
| 4,586,971 | 5/1986 | Wallace | 156/85 |
| 4,731,273 | 3/1988 | Bonk et al. | 428/57 |
| 5,022,941 | 6/1991 | Doheny, Jr. et al. | 156/85 |

FOREIGN PATENT DOCUMENTS

| | | |
|---|---|---|
| 0079610 | 5/1983 | European Pat. Off. . |
| 0163508 | 12/1985 | European Pat. Off. . |
| 2056192 | 3/1981 | United Kingdom . |
| 2190448 | 11/1987 | United Kingdom . |

OTHER PUBLICATIONS

Translation of Japanese Patent 54-149780, Showa Electric Wire & Cable Co., publication date Nov. 24, 1979.
British Serach Report, British Patent Application No. 9100373.1, Apr. 26, 1991.
International Search Report, International Application No. PCT/GB92/00028, Mar. 20, 1992.

*Primary Examiner*—Caleb Weston
*Attorney, Agent, or Firm*—Herbert G. Burkard; Marguerite E. Gerstner

[57] ABSTRACT

A wraparound heat shrinkable sheet for covering pipes or cables is positioned therearound so its longitudinal edges overlap. A first patch is then positioned over the lapped edges, and a second patch, which is wider than the first patch, positioned over the first patch and secured to the underlying wrapped sheet. Heat is then applied, preferably by hot mastic. The heat acts to shrink the sheet which tensions the second patch, thereby directing a radial force downward onto the first patch.

6 Claims, 2 Drawing Sheets

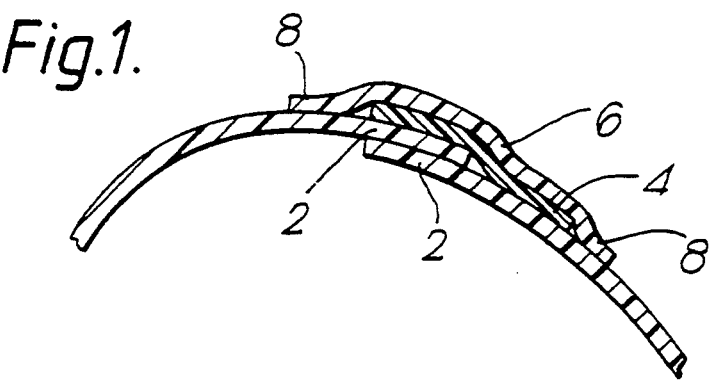
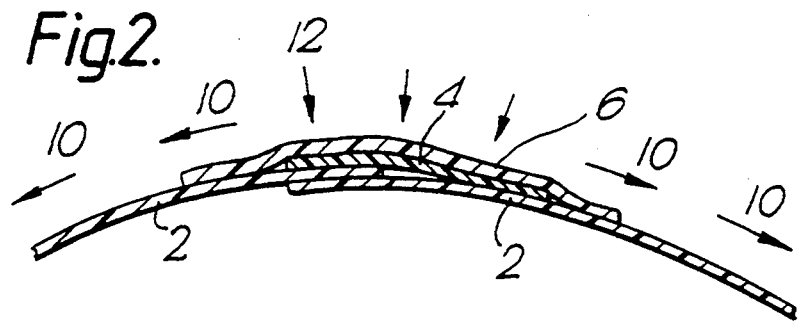
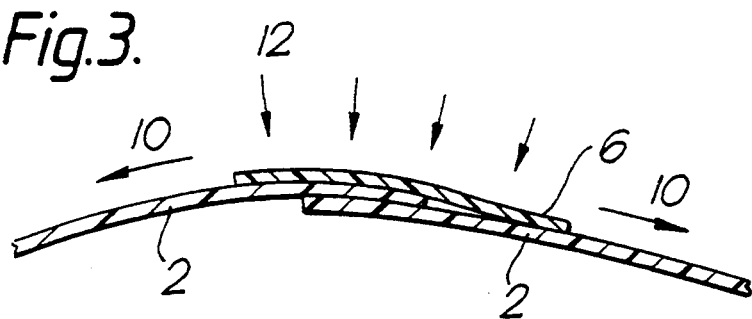

HEAT SHRINKABLE WRAPAROUND ARTICLES FOR COVERING ELONGATE OBJECTS

BACKGROUND OF THE INVENTION

1. Field of the Invention

This invention relates to heat shrinkable wraparound articles for covering elongate objects such as pipes or cables, or joints therebetween.

2. Introduction to the Invention

Heat shrinkable polymeric or fabric based articles are well known. Typically the articles are in the form of sleeves which possess the property of being able to shrink to smaller diameters when heated. Such a sleeve is constructed with a diameter large enough so that it can conveniently be placed about a substrate, and then it is heated, the heat causing it to shrink to conform to the substrate.

The heat shrinkable sleeves may be closed in cross-section, but, for ease of application inter alia they are preferably wraparound. Examples of such wraparound sleeves are described, for example in U.S. Pat. No. 3,455,336 (Ellis), and in U.S. Pat. No. 4,200,676 (Caponigro, Lopez), U.S. Pat. No. 4,586,971 (Wallace), EP 0163508 (Leest, Peigneur, van Beersel), U.S. Pat. No. 4,359,502 and JP 54-149780 (appno 53-59167).

In the above described wraparound heat shrinkable sleeves, the so-called closures for holding the wraparound closed, i.e., for holding the mating or overlapped ends of the sleeves together, may be mechanical, for example as described in U.S. Pat. No. 3,455,326, or based on direct bonding e.g. by adhesive or fusion, e.g. as described in U.S. Pat. No. 4,200,676 or in JP 54-149780. Where they are based on bonding to, or by, overlapped edges, it is typical to use a laminar panel or patch to bond to the overlapped edges. In these cases it is desirable not only to heat the article to shrink it, and perhaps also to activate an adhesive on the patch, but also to "pat" the patch, i.e. to provide a downward pressure on the patch, typically with a gloved hand, in order to form a good bond. Similarly where direct fusion is used to bond directly overlapped edges, it is typical to leave a section of the sleeve uncoated with adhesive to enable the sleeve (typically polyethylene) to bond to itself. In this case also a downward pressure onto the bonded area is desirable. In these applications it is also necessary to prevent the sleeve ends from slipping relative to each other, causing the wraparound sleeve to open. In certain situations application of a downward pressure and prevention of sleeve end slippage is difficult, if not impossible to achieve.

SUMMARY OF THE INVENTION

We have discovered a method of joining the ends of a wraparound cover which automatically generates a downward or radial pressure on the overlapped ends of the sleeve, and optionally also on a patch. The method also prevents relative slippage of the overlapped sleeve ends.

Thus the first aspect of the present invention provides a method of covering an elongate substrate comprising:

(i) positioning a wraparound heat shrinkable cover around the substrate so that the ends thereof overlap;

(ii) positioning a first laminar panel over the line defined by the overlapped ends of the cover, the first laminar panel being bondable (either directly, or by the action of an adhesive coating on at least part of its surface facing the cover) to the cover, at least when activated by heat;

(iii) positioning a second laminar panel over the first laminar panel, the second laminar panel being wider than the first laminar panel, so that its longitudinal edges project beyond the edges of the first laminar panel, and securing the said projecting longitudinal edges to the underlying cover portions, without the application of heat; and (iv) applying heat, wnereby the cover begins to shrink generating hoop stresses in the cover which tension the second laminar panel secured thereto, causing it to exert a generally radially directed force onto the underlying first laminar panel.

In one embodiment according to the invention the first laminar panel itself, or an adhesive coating thereon, must be activated by heat to bond it to the cover.

This invention is particularly advantageous for covering joints in weight coated steel pipes. Weight coated steel pipes, typically coated with concrete, are commonly used as submerged pipelines. Where a joint is to be made between the pipes the concrete is removed, and the steel pipes welded together. Then the joint must be protected and the removed weight coating made good in some way. The protection may be made using a standard heat shrinkable wraparound sleeve, such as that sold under the trade mark Thermofit WPC. Finally hot marine mastic may be poured typically at temperatures of 170° C.–200° C. into a casement surrounding the joint in order to replace the removed concrete. EP 0079610 (Ube) describes such an application where the hot marine mastic is actually used to heat and shrink the sleeve, although in more typically applications the shrinkable sleeves are installed using an external heat source such as propane gas, infra red or a hot air gun. Shrinking and bonding occurs when the sleeve is briefly exposed to temperatures in excess of 125° C.

The present application is of particular application for covering joints in weight coated sleeves using a casement into which hot marine mastic is applied. In such an application the heat shrinkable cover is first applied around the welded joint and then the first and second laminar panels applied, without the application of heat. Then a casement is positioned to bridge the concrete weight coating on either side of the joint, and hot mastic poured in. As the mastic contacts if the cover starts to shrink generating hoop stresses in the cover. The second laminar panel tensions, limiting slippage between the cover ends. Also the second laminar panel holds the first laminar panel in place until sufficient heat from the hot mastic penetrates (by normal heat conduction) through the first laminar panel to effect permanent bonding between the first laminar panel and the overlapped cover ends. Also the second laminar panel, in tensioning, applies a generally radially directed force downward onto the first laminar panel to enhance the bond. This downward or radial force is very important for a good bond between the first laminar panel and the cover ends. This downward force is of course generated by the cold securement of the second laminar panel to the cover, and the tensioning of the second laminar panel caused by shrinkage of, and resultant hoop stresses in, the cover.

It is also believed that a similar effect may be achieved without a first laminar panel.

Thus, a second aspect of the invention provides a method of covering an elongate substrate, comprising:

(i) positioning a wraparound heat shrinkable cover around the substrate so that the ends thereof overlap;

(ii) securing a second laminar panel to the cover portions on either side of the overlapped ends, without the application of heat, so that the second laminar panel overlies the overlapped ends; and (iii) applying heat to shrink the heat shrinkable cover, whereby the second laminar panel substantially prevents slippage between the overlapped ends of the cover.

In this case the second laminar panel holds the overlapped cover ends directly in contact until heat bonds the cover ends directly to each other, or bonds the overlapped cover ends directly to the second laminar panel. In these cases the sleeve ends may or may not comprise a section uncoated with adhesive to enhance the bond so formed.

A third aspect of the invention provides an assembly for covering an elongate substrate comprising:

(i) a wraparound cover the ends of which can be overlapped;

(ii) a first laminar panel which can be positioned over the overlapped ends of the cover; and (iii) a second laminar panel which is wider than the first laminar panel and can be positioned thereover so that edges thereof project beyond the edges of the first laminar panel, the said projecting edges of the second laminar panel being securable without the application of heat to the overlapped edges of the cover.

This invention may advantageously be used in situations which avoid entirely the use of hot air or infra red heaters or gas torches. For example where marine mastic or another hot medium is to be applied to the outside of a sleeve, this can be used to supply the heat to effect, shrinkage of the sleeve. All other applications are made cold (i.e. without the application of heat), and downward pressure onto the closure is generated automatically. The operation is therefore time efficient. This is particularly important in the application of coverings to joints in submerged weight coated pipelines, since these typically have to be done on off-shore lay barges, which are expensive to operate.

The heat shrinkable cover may, for example, comprise any of the materials commonly known or used in the field, or as described in any of the patent publications referred to above, the entire disclosures of which are incorporated herein by reference.

The first laminar panel may, for example comprise any of the materials commonly used as so called patch closures in the field, or as described in any of the patent publications referred to above.

The second laminar panel may comprise any material which can bond without the application of heat to the cover material, whereby that bond can withstand the slippage forces acting on it caused by shrinkage of the sleeve. A typical available material is commonly available type WPC tape, e.g. WPC-IV Z.

BRIEF DESCRIPTION OF THE DRAWING

Embodiments of the invention will now be described with reference to the accompanying drawings wherein:

FIG. 1 is a part cross-sectional view of a wraparound sleeve and first and second laminar panels according to the present invention, FIG. 2 is a schematic view showing the forces generated in the arrangement of FIG. 1;

FIG. 3 is a part cross-sectional view of a wraparound sleeve and second laminar panel according to the invention;

DETAILED DESCRIPTION OF THE DRAWING

Figure 4:
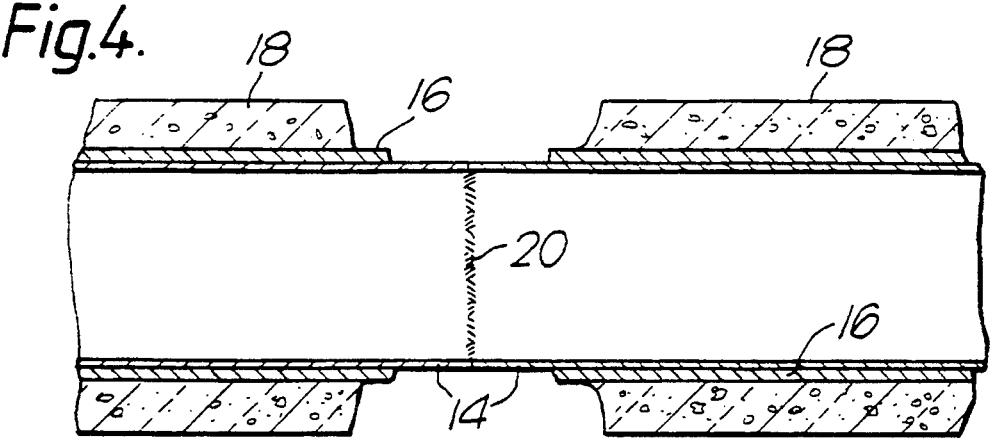
FIG. 4 shows a joint between weight coated concrete pipes, to be protected by an arrangement according to FIGS. 1 to 3.

FIG. 1 shows the overlapped ends 2 of a wraparound heatshrinkable sleeve made of cross-linked polyethylene. A closure path in the form of a first laminar panel 4 coated with adhesive (not shown) is laid over the overlapped ends 2. At this stage the panel 4 is not bonded to the sleeve ends 2 because the adhesive thereon requires the activation of heat for bonding. A second laminar panel 6 overlaps the first laminar panel 4. It is wider than the panel 4 so that its edges 8 project beyond the edges of panel 4. These edges 8 are secured without the application of heat to the overlapped sleeve ends 2.

FIG. 2 is a schematic view showing the forces generated in the arrangement of FIG. 1, caused by the application of external heat to the arrangement, e.g. as applied by pouring hot marine mastic (at approximately 170°–200° C.) into a casement surrounding the wraparound sleeve. On the application of heat the wraparound sleeve starts to shrink generating hoop stresses, as indicated by arrows 10, in the sleeve. This in turn causes the second laminar panel 6, secured thereto, to tension, which in turn exerts a downward, or radial force, as indicated by arrows 12, onto the first laminar panel 4. This enhances the bond between the adhesive on the panel 4 and the sleeve ends 2.

FIG. 3 shows an alternative embodiment where the first laminar panel 4 is omitted. In this case the cold applied, second laminar panel 6 holds the sleeve ends 2 in contact until externally applied heat, e.g. by hot mastic, bonds the sleeve overlap ends 2 directly together, or to the material of the second laminar panel. Hoop and radial forces 10 and 12 are generated as before.

FIG. 4 shows a joint between weight coated concrete pipes. Two steel pipes 14 are coated with an anti-corrosion layer 16 and an outer weight coating of concrete 18. The pipes have been bared of layer 16 and concrete 18 in the joint region in order to form weld 20.

Figure 5:
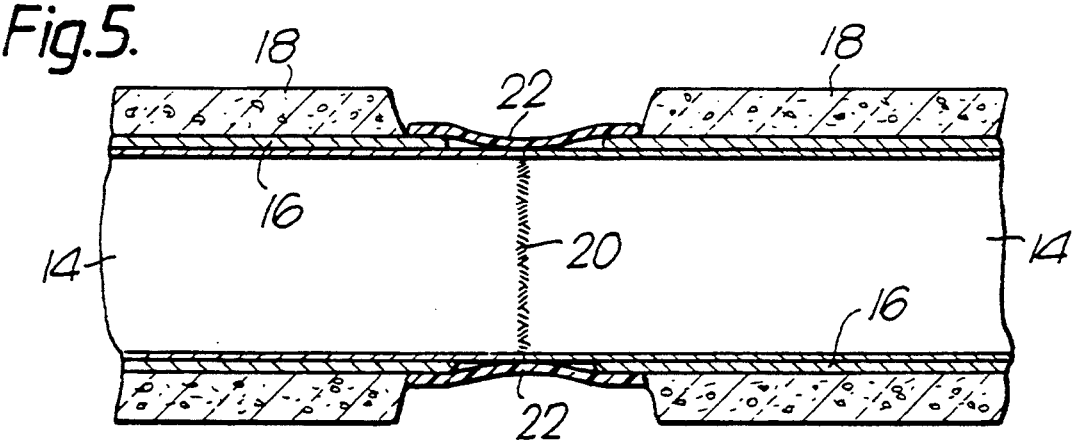
FIGS. 5 and 6 show application of the arrangement of FIGS. 1 to 3, and the application of hot marine mastic to the joint of FIG. 4.
Figure 6:
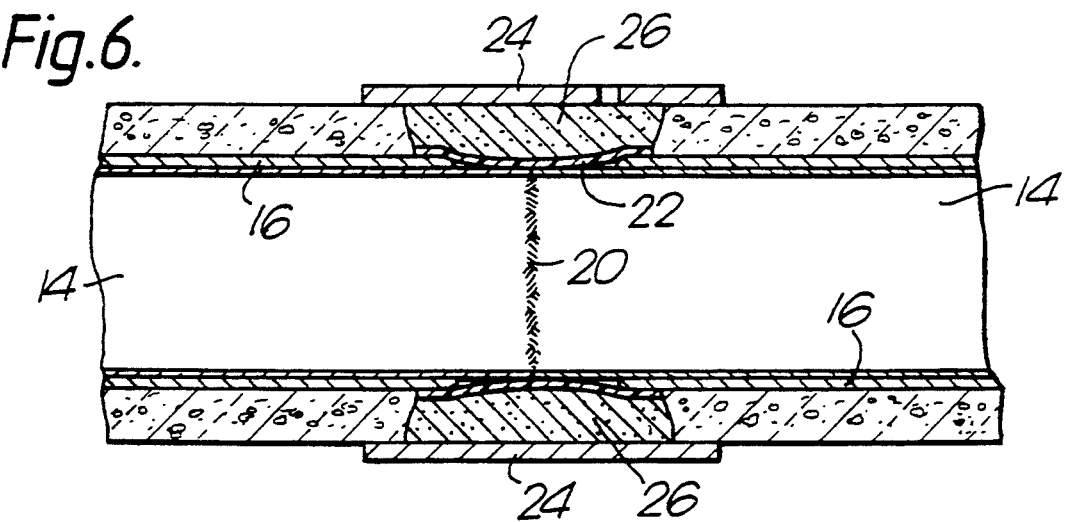

FIGS. 5 and 6 show the application of the present invention to protect weld 20. First a heat shrinkable wraparound sleeve 22 is positioned around the weld. It extends from the weld to overlap the anti-corrosion layer 16 (FIG. 5). The sleeve 22 is held closed by laminar panels according to the embodiments of FIGS. 1 and 3 (the panels are not shown in FIGS. 5 and 6). Then a casement 24 is placed to bridge the concrete 8 on either side of the joint, and hot marine mastic 26 is poured in at a temperature between 170° and 200° C. to fill the casement. The heat from the marine mastic causes sleeve 22 to shrink generating hoop stresses and consequent radial forces onto the overlapped sleeve ends (as discussed with reference to FIGS. 1 to 3). Hence a good bond is formed by the sleeve to cover the weld, without the application of a hot air gun or propane torch.

Using the above described embodiments, installation times for the sleeve of less than 1 minute, even less than 40 seconds have been achieved. Also on destructive testing peel strengths greater than 30N/25 mm have been produced in the sleeve.

We claim:

1. A method of covering an elongate substrate comprising:
   (i) positioning a wraparound heat shrinkable cover around the substrate so that the ends of the cover overlap;
   (ii) positioning a first laminar panel over a line defined by the overlapped ends of the cover, the first laminar panel being bondable, either (a) directly, or (b) by action of an adhesive coating on at least part of its surface facing the cover, at least when activated by heat; (iii) positioning a second laminar panel over the first laminar panel, the second laminar panel being distinct from the first laminar panel and wider than the first laminar panel, so that its longitudinal edges project beyond the edges of the first laminar panel, and securing the said projecting longitudinal edges to the underlying cover portions, without the application of heat; and
   (iv) applying heat, whereby the cover begins to shrink generating hoop stresses in the cover which tension the second laminar panel secured thereto, causing it to exert a generally radially directed force onto the underlying first laminar panel.

2. A method according to claim 1, wherein heat is applied by the positioning of molten marine mastic adjacent the heat shrinkable cover.

3. A method according to claim 1, for covering a joint between weight coated steel pipes.

4. An assembly for covering an elongate substrate comprising:
   (i) a wraparound cover the ends of which can be overlapped;
   (ii) a first laminar panel which can be positioned over the overlapped ends of the cover, and which, at least when activated by heat, is bondable, either (a) directly, or (b) by action of an adhesive coating positioned on at least part of its surface which, in use, faces the cover; and
   (iii) a second laminar panel which is distinct from the first laminar panel and wider than the first laminar panel and can be positioned thereover so that edges of the second laminar panel project beyond the edges of the first laminar panel, the said projecting edges of the second laminar panel being securable without the application of heat to the overlapped edges of the cover.

5. An assembly according to claim 4, for covering a joint between weight coated steel pipes.

6. An assembly according to claim 4, wherein heat is applied by the positioning of molten marine mastic adjacent the heat shrinkable cover.

* * * * *

UNITED STATES PATENT AND TRADEMARK OFFICE
CERTIFICATE OF CORRECTION

PATENT NO. : 5,397,615
DATED : March 14, 1995
INVENTOR(S) : VAN BEERSEL et al

It is certified that error appears in the above-indentified patent and that said Letters Patent is hereby corrected as shown below:

Column 2, Line 34, please replace "typically" by --typical--.
Column 2, Line 47, please replace "if," by --it--.
Column 3, Line 59, please replace "WPC-IV Z" by --WPCP-IV Z--.

Signed and Sealed this

Third Day of October, 1995

BRUCE LEHMAN

Attest:

*Attesting Officer*      *Commissioner of Patents and Trademarks*